July 4, 1944.  H. W. CHENEY  2,353,012
REMOVABLE SANITARY PIPE COUPLING
Filed March 10, 1941
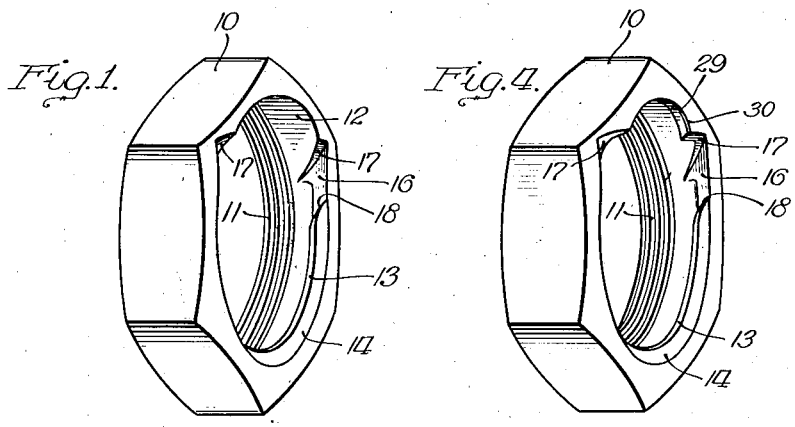
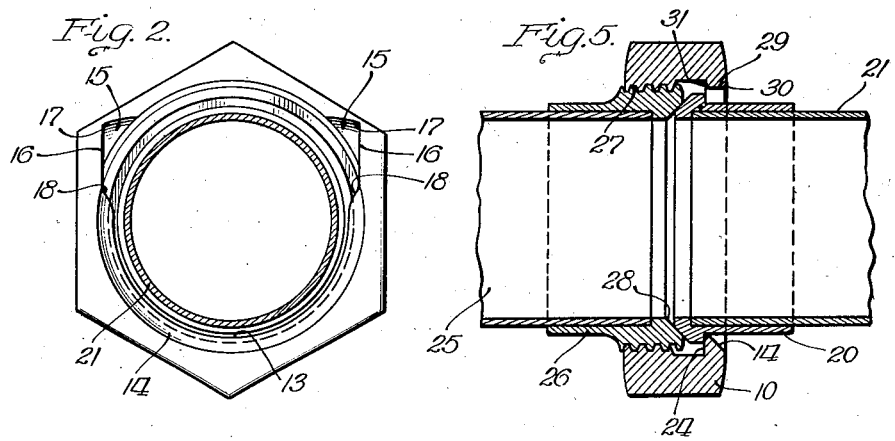
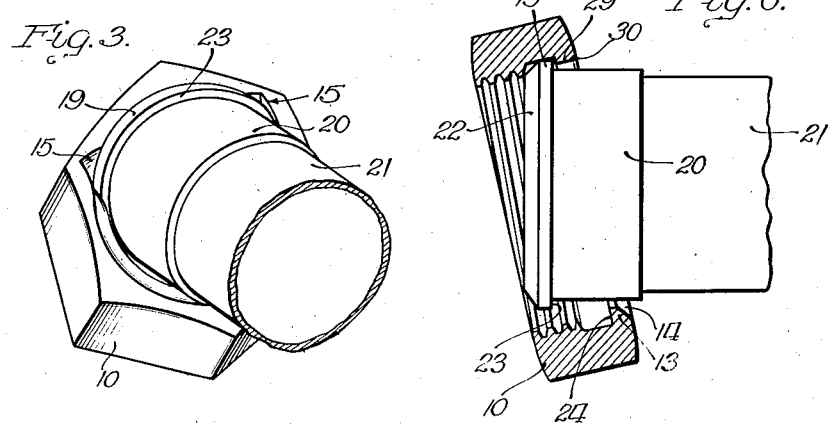
INVENTOR.
Harold W. Cheney
BY
Norman E. H. Peletz
Atty.

Patented July 4, 1944

2,353,012

UNITED STATES PATENT OFFICE 2,353,012

REMOVABLE SANITARY PIPE COUPLING

Harold W. Cheney, Little Falls, N. Y., assignor to Cherry-Burrell Corporation, Chicago, Ill., a corporation Application March 10, 1941, Serial No. 382,492

9 Claims. (Cl. 285—122)

This invention relates to improvements in pipe couplings which may be easily assembled and disassembled, and more particularly to separable and connectible sanitary couplings for separably joining the ends of pipe sections in a readily and quickly connectible and separable manner.

The invention is readily applicable to various types of couplings, however, it is particularly well adapted for use in joining the ends of pipe sections which must be frequently uncoupled for the purpose of cleaning and then recoupled for further use as is the practice in connection with sanitary pipes used in conjunction with food processing equipment such as may be found in milk processing plants.

The removable sanitary pipe coupling of the present invention, due to its unique construction, facilitates the rapid assembling and disassembling of the connected pipes for the reason that the coupling element is entirely removable from the ferruled ends of the pipe sections. Such an improved construction is readily distinguishable from the conventional pipe couplings used for coupling sanitary pipes in which the coupling element or coupling nut is not removable from the pipe sections.

The present invention also facilitates the more thorough and ready cleaning and inspection of all of the parts of the pipe coupling by virtue of the fact that all of the parts of the coupling arrangement are made readily accessible for cleaning and inspection when the coupling is disassembled. The complete disengageability of the coupling element from the pipe sections also aids in the fabrication of the ferruled pipe sections which are to be assembled to comprise a fluid conduit.

A conventional assembly of elements in a conventional sanitary pipe coupling comprises abutting ends of pipe sections provided with complementary male and female collars or ferrules adapted to be placed in registering and sealing engagement. The sealing and registering engagement is normally secured and maintained by an internally flanged and internally threaded coupling nut telescoped onto one of the pipe sections from which it cannot be removed. The coupling nut and the complementary collars or ferrules on the abutting ends of pipe sections enter into such cooperative relationship as to secure and maintain the abutting ends of the pipe sections in registering and sealing relationship.

Conventionally, the flange of the coupling nut engages a complementary flange on the ferrule or collar at the end of a pipe section over which the nut is telescoped. The opposite end of the coupling nut engages screw threads on the outer periphery of the ferrule or collar of the other abutting pipe section. Obviously, upon tightening the coupling nut the complementary ferruled ends of the abutting pipe sections are brought into and retained in registering and sealing relationship.

The disadvantages of the conventional sanitary pipe coupling, as above described, reside in the necessity of telescopically assembling the coupling nut onto a length or section of pipe before the enlarged ferrule or collar is welded or otherwise fixed to the end of such a pipe section. The inability to remove such a coupling nut from the end of such a pipe section to enable the thorough cleaning and inspection of the coupling members after thus being assembled upon a pipe section is a further disadvantage of the conventional coupling arrangement.

The assembling and cleaning disadvantages of the conventional sanitary pipe coupling, as just enumerated, are especially serious when considered with respect to a short length of pipe or pipe section in which it is very difficult, if not impossible, to move the entrapped coupling nut a sufficient distance from the end of the pipe section to permit the ready affixing of the enlarged ferrule to the end of the pipe section or to permit the subsequent ready cleaning and inspection of the interior of the coupling nut and the exterior of the ferruled end of the pipe section after the ferrules and coupling nut have been assembled on a pipe section.

Some of the above difficulties could readily be eliminated by the use of a sectional or split type of coupling nut. Such sectional or split type of coupling nut is readily removable from a pipe section. The sectional coupling nut, however, entails certain offsetting disadvantages which relate to the difficulties of fabricating the same and the additional difficulties of coupling the ends of pipe section with a sectional or split type of coupling nut. The increased cost of manufacture and the increased difficulties of assembly, as well as the inherent weaknesses due to structural characteristics, are several of the disadvantages of such a sectional or split type of coupling nut.

It is, therefore, the prime objective of the present invention to provide a coupling nut or sleeve for coupling pipe sections and the like in which the unitary coupling nut may be easily and readily removed from the ferruled ends of the joined pipe sections without removing the ferrules from the pipe sections; in which the fabrication of a pipe section having ferruled ends, for use with a coupling nut of the type which must normally be telescoped over said pipe sections before the ferruled ends are affixed thereto, is facilitated by eliminating the necessity of telescoping the coupling nut over the pipe sections before the enlarged ferrules are welded or otherwise fixed to the ends thereof; in which the coupling nut is laterally removable from the pipe section over which it is telescoped when in assembled order; in which the improved coupling nut comprises a unitary construction of substantially the same strength as the conventional coupling nut; in which the improved coupling nut is readily interchangeable with the conventional coupling nut for coupling the ferruled ends of pipe sections normally adapted to be coupled by the same size of conventional coupling nut; in which the coupling nut is provided with peripheral gripping surfaces of the same number and size as those provided on the conventional type of coupling nuts; and in which the improved coupling nut, which is laterally removable from the ferruled ends of a pipe section, is provided with means for hanging the coupling nut on the ferruled end of a pipe section substantially in assemblable position.

These and other objectives and advantages of the present invention which will become more apparent as the nature of the invention is better understood, are preferably accomplished according to the illustrations of the preferred embodiment of the invention in a removable sanitary pipe coupling as shown in the accompanying drawing. The organization and methods of operation will best be understood from the following description of the preferred embodiments of the present invention when read in connection with the accompanying drawing in which:

Figure 1 is a perspective view of an internally threaded coupling nut showing the improved and novel feature of my invention in the preferred embodiment thereof.

Figure 2 is a side elevation, partially in section, of the improved coupling nut shown in Figure 1, together with the ferruled male end of a pipe section assembled in operative position therein.

Figure 3 is a perspective view showing the improved coupling nut of the preferred embodiment as shown in Figure 1 partially assembled upon the ferruled male end of a pipe section.

Figure 4 is a perspective view of a modified embodiment of the invention similar to the view shown in Figure 1.

Figure 5 is a longitudinal section taken through an entirely assembled coupling unit using a coupling nut of the modified type as shown perspectively in Figure 4.

Figure 6 is a longitudinal view, partially in section and partially in elevation, of a partially assembled coupling unit using a coupling nut of the modified type as shown perspectively in Figure 4.

Referring to the figures showing the preferred embodiment of the invention, like numerals being used to identify like elements, 10 represents the shell of an imperforate hexagon-shaped coupling nut or element having inwardly extending screw threads 11 at one end of the normal inner cylindrical periphery 12 of the coupling nut and a sectional arcuate inwardly extending flange 13 at the opposite end of the inner cylindrical periphery 12. The arcuate flange 13 is provided on its outer surface throughout its entire length with an inwardly beveled face 14. The arcuate flange 13 extends through an arc of a circle in excess of a semi-circle.

In the preferred embodiment, as shown in the drawing, the arcuate flange 13 extends through approximately 210 degrees of an arc of a circle. Opposite recesses 15 are provided at both ends of the flange 13 in the inner cylindrical periphery 12 of the coupling element or shell 10 and are accordingly positioned to one side of a longitudinal axial plane of the coupling element. The outer walls 16 of the recesses 15 are defined by flat faces parallel to a diametral plane of the shell 10, which plane bisects the arcuate flange 13. The upper walls 17 of the recesses 15 are substantially parallel to the lower walls 18 of the opposed recesses 15. The walls 17 and 18 are at an angle to the plane of the end of the coupling sleeve or shell 10 and are inclined away from the arcuate flange 13. The lower walls 18 of the opposed recesses 15 define the ends of the arcuate flange 13. The plane of the walls 17 and the plane of the walls 18 would form substantially equal angles with a diametral plane of the shell 10, 90 degrees removed from the previously referred to diametral plane of the shell 10 which would bisect the arcuate flange 13.

In the improved coupling nut or coupling element, the parallel outer walls 16 of the opposed recesses 15 are spaced apart slightly in excess of the outer diameter of the outwardly extending male flange 19 on the ferrule 20 welded or otherwise affixed to the end of the pipe section 21. The flange 19 is provided with an outwardly beveled centering and sealing front face 22 and a flat rear face 23 perpendicular to the axis of the ferrule 20 and the pipe section 21. The rear face 23 of the flange 19 is adapted to engage a complementary inner flat face 24 of the arcuate flange 13 in the coupling nut or sleeve 10.

As clearly shown in Figure 3, the upper walls 17 of the opposed recesses 15 are spaced from the lower walls 18 of these recesses 15 a sufficient distance to permit the inward and downward passage therethrough of the flange 19 when the rear face 23 of the flange 19 is parallel to the lower walls 18 of the opposed recesses 15 and in sliding contact therewith. The flange 19, when in position within the recesses 15, as just described, in order to be placed in coupling position within the coupling nut 10 is moved inwardly and downwardly while being pivoted about an axis passing through the line of contact between the rear face 23 of the flange 19 and the lower walls 18 of the opposed recesses 15. Such inward and downward pivotal movement is continued until the entire flange 19 is embraced by the inner cylindrical peripheral wall 12 of the coupling sleeve 10. When the ferrule 20 on the end of the pipe section 21 has been moved in coupling position, the rear face 23 of the flange 19 on the ferrule 20 will engage the complementary inner face 24 of the arcuate flange 13.

The maximum dimension between the inner cylindrical periphery 12 of the shell or coupling sleeve 10 and the inner arcuate surface of the arcuate flange 13 must always be in excess of the outer diameter of the ferrule 20 plus the radial width of the flange 19.

The angle of the beveled face 14 of the arcuate flange 13 with respect to the plane of the corresponding end of the coupling sleeve 10, which plane is perpendicular to the axis of the sleeve 10, must be such as to accommodate the ferrule 20 when the flange 19 is inserted inwardly into the recesses 15 and pivoted downwardly into coupling position as previously described and as illustrated in Figure 3.

Figure 2 shows the ferruled end of the pipe section 21 in coupling position in the improved embodiment of the coupling nut as illustrated in Figure 1. It is obvious, upon examining Figure 2, that the coupling engagement between the annular flange 19 on the ferrule 20 and the sectional arcuate flange 13 on the inner cylindrical surface 12 of the coupling sleeve 10 is in excess of 180 degrees. The preferred embodiment, as illustrated, discloses such engagement to be through an arc of approximately 210 degrees of a circle.

The upper portion of the flange 19, as shown in the drawing, is not engaged by a compression flange within the coupling sleeve 10 to urge it toward centering and sealing position with the complementary pipe section 25 which is provided with a complementary female end ferrule 26 having outer peripheral screw threads 27. The screw threads 27 are adapted to engage the inner peripheral screw threads 11 of the coupling nut or sleeve 10. An inwardly beveled female face 28 of the ferrule 26 is adapted to centeringly and sealingly engage the complementary outwardly beveled male face 22 on the flange 19.

The above described improved laterally removable type of sanitary pipe coupling nut or sleeve permits the ready placement and removal thereof upon and from the ferruled end of a pipe section, the placement and removal thereof upon and from the ferruled end of a pipe section being accomplished by the lateral movement of the nut over the male ferrule.

A coupling nut of the improved type embodying the present invention retains all the outer peripheral wall and peripheral gripping faces which facilitate the easy handling of the improved coupling nut when joining the coupling elements of a pipe coupling. The construction, as disclosed in the drawing of the preferred embodiment of the present invention, also provides for the necessary strength of the coupling elements. Obviously, a coupling nut of the type embodying the present invention facilitates the ready cleaning and inspection of the coupling nut both on the the interior and exterior surfaces thereof, as well as the ready cleaning and inspection of the outer surfaces of the ferruled ends of the pipe sections. This is possible even in cramped quarters due to the removability of the coupling nut from the pipe sections and the ferruled ends thereof.

The same removable feature of the present improved coupling nut also facilitates the fabrication of the ferruled pipe sections by avoiding the necessity of first placing the coupling nut on the pipe sections before the ferrule ends are welded to the ends of the pipe sections, as is the conventional practice in the assembly of pipe sections, ferrules and coupling nuts adapted for the conventional type of sanitary pipe coupling.

In Figure 4 is shown a modification of the present invention in which a sectional arcuate flange 29 is provided along the inner cylindrical periphery 12 of the coupling sleeve 10 between the upper walls 17 of the opposed recesses 15. The sectional arcuate flange 29 is in the same plane with the sectional arcuate flange 13 and is in opposed position with respect thereto. The flanges 29 and 13 are of equal thickness and the flange 29 is provided with an inwardly beveled face 30 complementary to the beveled face 14 of the flange 13. The flange 29 is also provided with an inner flat face 31 complementary to the inner face 24 of the flange 13. The arcuate flange 29 is, however, of substantially less radial depth than the arcuate flange 13, the flange 29 being only of sufficient radial depth to permit the engagement of the upper edge of the flange 19 on the ferrule 20 with the inner face 31 thereof, as shown in Figure 6, whereby the coupling nut or sleeve 10 may be supported in substantial coupling position upon the ferruled end of the pipe section 21. Obviously, the internally threaded coupling sleeve 10 may also be supported upon the threaded ferrule 26 on which the coupling nut or sleeve 10 is carried when in coupling position.

As clearly shown in Figure 5, the flange 29 is not of sufficient radial depth to overlap the flange 19 when the coupling members are assembled. The maximum dimension between the inner peripheries of the flanges 13 and 29 must be sufficient to permit the insertion of the flange 19 into the opposed recesses 15 and the pivotal inward and downward movement thereof into coupling position, as previously described with respect to the same inward and downward pivotal movement of the flanged ferrule 20 for the purpose of moving the ferrule 20 into coupling position within the preferred embodiment of the coupling nut as depicted in Figures 2 and 3.

The modified embodiment of the present invention as just described and as shown in Figures 4, 5 and 6 provides an additional advantage over the preferred embodiment of the invention as shown in Figures 1, 2 and 3 and as first described in this application. In the modified embodiment of the present invention the additional internal sectional arcuate flange 29 in the coupling nut or sleeve 10 permits the ready suspension or support of the coupling nut upon the unthreaded or male ferruled end of the pipe section 21.

Although the invention has been primarily described in its preferred embodiment and a modified improvement thereof, various modifications of the invention may be readily apparent to those skilled in the art. The scope of the present invention is, however, not to be restricted except in so far as necessitated by the prior art and the spirit of the appended claims.

The invention is hereby claimed as follows:

1. In a separable pipe coupling, male and female pipe sections having round circular complementary juxtaposed ends adapted for abutting engagement, and an imperforate-walled coupling sleeve adapted to be disengageably carried on one of said sections and having means to overlap the entire juxtaposed end of the other of said pipe sections, said last mentioned means having a cut-out portion to receive the complementary end on the other of said pipe sections when tilted with respect to said sleeve.

2. An imperforate-walled coupling sleeve of the character described having a cylindrical inner peripheral wall and having at one end of its inner periphery an internal arcuate sectional inwardly directed flange extending through the major portion of a circle and two opposed recesses positioned at the opposite ends of said internal flange and to one side of a longitudinal axial plane of said sleeve.

3. An imperforate-walled coupling nut of the type described including an internal sectional arcuate flange extending through the major portion of a circle, and opposed recesses in the inner periphery of said nut defining the ends of said arcuate flange, said recesses being positioned to one side of a longitudinal axial plane of said coupling nut and being defined by upper and lower walls inclined to the plane of the adjacent end of said coupling nut.

4. In a separable pipe coupling, male and female pipe elements having complementary ferruled ends adapted for abutting engagement, a cylindrical coupling sleeve having circular end faces and adapted to be disengageably carried on one of said elements, and transversely and inwardly extending internal sectional flange means carried by said sleeve and engagingly overlapping an outwardly turned flange on the other of said elements, said flange means carried by said sleeve extending through at least 180 degrees of an arc of a circle, said sleeve having opposed internal recesses adjacent the ends of said sectional flange to receive the ferruled end of the other of said pipe elements.

5. A coupling element of the type described for coupling abutting male and female ferruled ends of pipe sections, a coupling nut having an imperforate cylindrical wall disengageably carried on the ferruled female end of one of said pipe sections, said coupling nut having an inwardly directed internal sectional arcuate flange at one end for overlapping and engaging the ferruled male element of the other of said pipe sections, and opposed recesses in the inner cylindrical imperforate wall of said coupling nut at the ends of said arcuate flange for receiving said ferruled male element when tilted with respect to the plane of the end of said coupling nut.

6. In a separable pipe coupling, male and female pipe elements having complementary ferruled ends in abutting relation, an imperforate tubular coupling sleeve having circular end faces disengageably carried on one of said elements, and transversely and inwardly extending internal arcuate flange means on the inner periphery of said sleeve at one end thereof and entirely overlapped by said imperforate sleeve and engagingly overlapping a portion of an outwardly turned sectional flange on the other of said elements, one section of said flange means carried by said sleeve extending through an arc of a circle in excess of 180 degrees but less than 360 degrees, said sleeve having opposed internal recesses to receive the ferruled end of the other of said pipe elements.

7. In a separable pipe coupling, male and female pipe elements having complementary ferruled ends in abutting relation, a tubular imperforate coupling sleeve having circular end faces disengageably carried on one of said ferruled pipe elements, and transversely and inwardly extending internal arcuate sectional flange means on the inner periphery of said sleeve at one end thereof and entirely overlapped by the wall of said sleeve and engagingly overlapping a portion of an outwardly turned flange on the other of said ferruled pipe elements, said flange means carried by said sleeve extending through an arc of a circle in excess of 180 degrees, said sleeve having opposed internal recesses entirely overlapped by said imperforate sleeve to receive the ferruled end of the other of said pipe elements and completely encompassing the ferruled ends of said pipe elements when coupled together.

8. A separable pipe coupling comprising, in combination, first and second pipe sections having complementary ferruled ends in registering and sealing relation, coupling means carried on the ferruled end of the first pipe section and having an inner cylindrical periphery, said coupling means cooperating with the ferruled ends of both of said pipe sections to move them into sealing and registering engagement, an outer peripheral flange on the ferruled end of the second pipe section, and a sectional arcuate flange on said inner cylindrical periphery of said coupling means, said inner cylindrical periphery being of such a diameter that the greatest dimension between said periphery and said arcuate flange is in excess of the outer diameter of the ferruled end of said second pipe section plus the radial width of the outer peripheral flange thereon.

9. In a pipe coupling, first and second pipe sections, an outwardly threaded ferrule on the end of said first pipe section having an inwardly beveled end face, an exteriorly flanged ferrule on the end of said second pipe section having an outwardly beveled end face complementary to said inwardly beveled end face, an imperforate walled coupling nut having internal threads at one end engaging the threads on the ferrule on said first pipe section and having an internal sectional arcuate flange completely overlapped by the imperforate wall of said coupling nut at its opposite end and overlappingly engaging the flange on the ferruled end of said second pipe section, said coupling nut having an imperforate internal cylindrical surface, and opposed recesses in said cylindrical surface at the ends of said arcuate flange, whereby upon unscrewing said coupling nut from the ferrule on said first pipe section said coupling nut may be tilted with respect to the plane of the flange on the ferruled end of said second pipe section so that said ferruled end may be withdrawn from said coupling nut by passing said flange through said opposed recesses.

HAROLD W. CHENEY.